(12) United States Patent
Lundberg et al.

(10) Patent No.: US 10,567,713 B2
(45) Date of Patent: Feb. 18, 2020

(54) CAMERA AND METHOD OF PRODUCING COLOR IMAGES

(71) Applicant: Axis AB, Lund (SE)

(72) Inventors: Stefan Lundberg, Lund (SE); Jonas Hjelmström, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 15/857,127

(22) Filed: Dec. 28, 2017

(65) Prior Publication Data

US 2018/0184054 A1 Jun. 28, 2018

(30) Foreign Application Priority Data

Dec. 28, 2016 (EP) ..................................... 16207122
Dec. 28, 2016 (EP) ..................................... 16207126
(Continued)

(51) Int. Cl.
*H04N 9/07* (2006.01)
*H04N 5/33* (2006.01)
(Continued)

(52) U.S. Cl.
CPC ............... *H04N 9/07* (2013.01); *G02B 5/201* (2013.01); *G02B 5/208* (2013.01); *G02B 7/006* (2013.01);
(Continued)

(58) Field of Classification Search
CPC .......... H04N 9/07; H04N 5/332; H04N 5/396; G02B 5/201; G02B 5/208; G02B 7/006; G03B 7/00; G03B 11/00
See application file for complete search history.

(56) References Cited

U.S. PATENT DOCUMENTS 6,642,955 B1 11/2003 Midgley et al.
7,936,986 B2 5/2011 Ichimiya
(Continued)

FOREIGN PATENT DOCUMENTS

CN 101064778 A 10/2007
CN 101078856 A 11/2007
(Continued)

OTHER PUBLICATIONS

EP 17209246.2 Extended European Search Report (dated May 7, 2018).
(Continued)

*Primary Examiner* — John R Schnurr
(74) *Attorney, Agent, or Firm* — Volpe and Koenig, P.C.

(57) ABSTRACT

A camera comprising: an aperture; an image sensor comprising a plurality of pairs of pixels where in each pair: a first pixel is configured such that it detects radiation which has entered the camera through the aperture to the image sensor via a first radiation path, and a second pixel is configured such that it detects radiation which has entered the camera through the aperture to the image sensor via a second radiation path, the second radiation path being different from the first radiation path; and a filter arranged in the vicinity of the aperture, wherein the filter comprises a first portion configured to block IR-radiation or visible light and a second portion configured to be transparent to wavelengths that are blocked by the first portion, wherein radiation passing the first portion travels to the first pixels, and radiation passing the second portion travels to the second pixels.

11 Claims, 4 Drawing Sheets

(30) Foreign Application Priority Data

Jun. 29, 2017 (EP) .................................... 17178716
Dec. 21, 2017 (EP) .................................... 17209246

(51) Int. Cl.
| | |
|---|---|
| G02B 7/00 | (2006.01) |
| G02B 5/20 | (2006.01) |
| G03B 11/00 | (2006.01) |
| H04N 5/225 | (2006.01) |
| G03B 7/00 | (2014.01) |
| H04N 5/369 | (2011.01) |

(52) U.S. Cl.
CPC .............. *G03B 7/00* (2013.01); *G03B 11/00* (2013.01); *H04N 5/2254* (2013.01); *H04N 5/332* (2013.01); *H04N 5/3696* (2013.01)

(56) References Cited

U.S. PATENT DOCUMENTS

| | | | |
|---|---|---|---|
| 8,068,159 | B2 | 11/2011 | Choe et al. |
| 9,420,164 | B1 | 8/2016 | Galor Gluskin et al. |
| 10,051,211 | B2 | 8/2018 | Chen et al. |
| 2002/0001464 | A1 | 1/2002 | Ohsawa |
| 2002/0003583 | A1 | 1/2002 | Arai |
| 2002/0044212 | A1 | 4/2002 | Hashimoto |
| 2005/0008358 | A1 | 1/2005 | Kanome et al. |
| 2010/0102366 | A1 | 4/2010 | Lee et al. |
| 2011/0228145 | A1 | 9/2011 | Kimura |
| 2011/0228399 | A1 | 9/2011 | Ohnishi |
| 2012/0025080 | A1 | 2/2012 | Liu et al. |
| 2012/0026325 | A1 | 2/2012 | Bunker et al. |
| 2012/0087645 | A1 | 4/2012 | Wu et al. |
| 2013/0222603 | A1 | 8/2013 | Agranov et al. |
| 2015/0062422 | A1 | 3/2015 | Stern |
| 2015/0357364 | A1 | 12/2015 | Kim |
| 2015/0373278 | A1 | 12/2015 | Hattori et al. |
| 2015/0381907 | A1 | 12/2015 | Boettiger et al. |
| 2016/0127659 | A1 | 5/2016 | Kawasaki |
| 2016/0172399 | A1 | 6/2016 | Nakata |
| 2017/0115436 | A1* | 4/2017 | Qian ................. H01L 27/14621 |
| 2017/0187948 | A1 | 6/2017 | Wang |
| 2017/0208261 | A1 | 7/2017 | Kobayashi |
| 2017/0230638 | A1 | 8/2017 | Wajs et al. |
| 2017/0257546 | A1 | 9/2017 | Shahid |
| 2017/0264811 | A1* | 9/2017 | Ollila ................. H04N 5/23212 |
| 2017/0374299 | A1* | 12/2017 | Liu ........................ H04N 5/332 |
| 2018/0040109 | A1* | 2/2018 | Hayashi ................. H04N 1/409 |
| 2018/0158208 | A1* | 6/2018 | Higashitsutsumi ........................ H01L 27/14627 |

FOREIGN PATENT DOCUMENTS

| | | |
|---|---|---|
| CN | 202159217 U | 3/2012 |
| CN | 104702924 A | 6/2015 |
| CN | 105430363 A | 3/2016 |
| JP | 3086673 U | 9/1991 |
| JP | 10171026 A | 12/1996 |
| JP | 2001-036807 A | 2/2001 |
| JP | 2002-189238 A | 7/2002 |
| JP | 2003-264842 A | 9/2003 |
| JP | 2003-274229 A | 9/2003 |
| JP | 2004-341137 A | 12/2004 |
| JP | 2004-361590 A | 12/2004 |
| JP | 2006-78666 A | 3/2006 |
| JP | 2006-157413 A | 6/2006 |
| JP | 2010-068020 A | 3/2010 |
| JP | 2013-152369 A | 8/2013 |
| JP | 2014-225828 A | 12/2014 |
| JP | 2016-184082 A | 10/2016 |
| WO | 2011/101036 A1 | 8/2011 |
| WO | 2012/018047 A1 | 2/2012 |

OTHER PUBLICATIONS

EP 16207126.0 European Search Report (dated May 11, 2017).
EP 16207122.9 European Search Report (dated Apr. 7, 2017).
EP 17178716.1 European Search Report (dated Dec. 7, 2017).
Japanese Office Action dated Feb. 26, 2019 for the Japanese Patent Application No. 2017-243814.
Korean Office Action dated May 10, 2019 for the Korean Patent Application No. 10-2018-0050062.
Chinese Office Action dated Sep. 19, 2019 for the Chinese Patent Application No. 201810597300.0.

* cited by examiner

CAMERA AND METHOD OF PRODUCING COLOR IMAGES

FIELD OF INVENTION

The present teachings relate to producing color images. In particular, the present teachings relate to a camera design allowing for producing color images under low light conditions.

BACKGROUND

Image sensors used in digital cameras have a spectral response with a non-negligible component in the infrared (IR). This results in opportunities as well as challenges.

An opportunity lies in that during night time, or in low-light conditions the IR-component may provide useful information about the imaged scene. Typically, low light conditions occur during dusk or dawn. Other low light condition scenes are badly lit rooms. Low-light condition may also be defined as conditions where the amount of visible light and IR-radiation are comparable, hence, low-light condition may also be referred to as a mixed light condition.

During night time, or in low-light conditions use may be made of incoming radiation from the IR portion of the spectrum. The IR radiation will not contain any color information, and instead of performing a color separation, the only parameter is the intensity of the incoming radiation, which may be presented as a black and white intensity image (or with any desirable color scale).

A challenge is found during day-time imaging, where the addition of an IR-component may distort the color balance in images captured using a digital camera. In some situations, some or all pixels of the image sensor may even be completely saturated by the infrared component.

A way of maintaining the beneficial effects while suppressing the less beneficial effects is to add a movable IR-cut filter in the beam path in front of the image sensor. In this way, the IR-cut filter may be used during daylight conditions, enabling acquisition of color images. Pixels of the image sensor will then operate in a first manner, where the incident light is divided into colors and detected as a charge on individual photodetectors thus enabling color separation. The IR-cut filter will be removed during night time, or in low-light conditions allowing IR-radiation to reach the image sensor. Pixels of the image sensor will then operate in a second manner, where the only parameter measured by the pixels is the intensity of the incoming radiation. Hence, intensity based images may be captured, and presented in black and white.

There may, however, be instances where it would be desirable to be able to capture color separated images even in low-light conditions.

SUMMARY

In view of the above, it is an object of the disclosure to provide means for capturing color separated images even in low-light conditions.

According to a first aspect, a camera is provided. The camera comprises: an aperture; an image sensor comprising a plurality of pairs of pixels in which pair: a first pixel is configured such that it detects radiation which has entered the camera through the aperture and traveled from the aperture to the image sensor via a first radiation path, and a second pixel is configured such that it detects radiation which has entered the camera through the aperture and traveled from the aperture to the image sensor via a second radiation path, the second radiation path being different from the first radiation path; and a filter arranged in, or in the vicinity of, the aperture, wherein the filter comprises a first portion configured to block IR-radiation or visible light and a second portion configured to be transparent to wavelengths that are blocked by the first portion, wherein the filter is arranged such that radiation passing the first portion travels to the first pixels of the plurality of pairs of pixels, and such that radiation passing the second portion travels to the second pixels of the plurality of pairs of pixels.

Hence, improved imaging is enabled. This is due to components of IR-radiation may be determined by comparing radiation detected by the first and second pixels in each pair of first and second pixels, and compensating for that IR portion. For example, a color image may be produced by determining the IR-portion of radiation detected by the image sensor. In this way, a true color representation may be obtained, even though the imaged scene contains IR-radiation which is captured by the image sensor.

The term "radiation" is to be construed as radiation comprising spectral components both in the infrared spectral range and in the visible light spectral range.

The first portion of the filter may be configured to block IR-radiation. The first portion of the filter may be configured to block visible light.

The second portion of the filter may be configured to be transparent to both IR-radiation and visible light.

The first portion of the filter may be configured to block IR-radiation and the second portion of the filter may be configured to block visible light.

The filter may be fixedly positioned in, or in the vicinity of, the aperture. A simple camera with very few movable parts may thus be provided. The filter does not have to be (often cannot be) exactly in the aperture plane, but as long as it is close enough, it does not matter which side of the aperture it is.

The filter has to be close to the aperture. It does not have to be (often cannot be) exactly in the aperture plane, but as long as it is close enough, it does not matter which side of the aperture it is.

The filter may movable such that it may be positioned in and retracted from the first and second radiation paths. Thus, it will be possible to put the camera in different modes, such as a day mode wherein the filter with the first and second portions are used for calculating a proportion of IR-radiation in the scene based on an amount of radiation detected by each of the first and second pixels of the plurality of pairs of pixels and a night mode wherein the filter is removed, and the full spectral response of the image sensor is used for producing black and white images.

The filter is useful when the scene comprises both visible light and IR-radiation. In these situations, it is possible to compensate for the IR-radiation and get good color fidelity. This is particularly useful in mixed light (low light, such as at dusk and dawn), where in implementation of today a switch to only registering the amount of radiation removing the IR cut filter is used. This is needed when the visible light level gets too low. In day light or good light, the IR-radiation is not needed, because there is plenty of visible light. However, the camera set up according to the present teachings makes it possible to compensate for the IR-radiation. In traditional monitoring cameras, this is when the IR cut filter is inserted.

At night, or in other really low light, there is basically no visible light, and at least a lot more IR radiation than visual light, so it will be very hard to produce color images. Thus, the filter might be removed at night. This so that as much radiation as possible is reaching the image sensor (by not blocking any IR-radiation). This switch to night mode may be postponed to lower light levels using the present teachings.

The portioning of the filter may be aligned with the first and second pixels such that: IR-radiation will not reach the first pixels in the pair of pixels, and IR-radiation will reach the second pixels in the pair of pixels.

Each pixel of the image sensor may belong to a respective pair of pixels.

The image sensor may be configured to, upon the camera being exposed to radiation comprising both visible light and IR-radiation, register a value indicative of an amount of radiation reaching each of the plurality of pairs of pixels. The camera may further comprise a processing unit configured to: determine, for each of the first pixels of the plurality of pairs of pixels, a value indicative of a first amount of radiation detected by the respective first pixel, determine, for each of the second pixels of the plurality of pairs of pixels, a value indicative of a second amount of radiation detected by the respective second pixel, calculate a proportion of IR-radiation in the scene based on the first and second amount of radiation determined for each of the first and second pixels of the plurality of pairs of pixels, and produce a color image of the scene by compensating for an IR-contribution in an image captured by the camera based on the calculated proportion of IR-radiation.

According to a second aspect, a method of producing a color image of a scene captured by a camera exposed to radiation comprising both visible light and IR-radiation is provided. The method comprises: detecting a value indicative of an amount of radiation in each of a plurality of pairs of pixels, wherein each pair comprises a first pixel and a second pixel, determining, for each of the first pixels of the plurality of pairs of pixels, a value indicative of a first amount of radiation detected by the respective first pixel, determining for each of the second pixels of the plurality of pairs of pixels a value indicative of a second amount of radiation detected by the respective second pixel, calculating a proportion of IR-radiation in the scene based on the first and second amount of radiation determined for each of the first and second pixels of the plurality of pairs of pixels, and producing the color image of the scene by compensating for an IR-contribution in an image captured by the camera based on the calculated proportion of IR-radiation.

The method may further comprise blocking IR-radiation or visible light from reaching the first pixels of the plurality of pairs of pixels, and allowing wavelengths that are blocked from reaching the first pixels of the plurality of pairs of pixels to reach the second pixels of the plurality of pairs of pixels.

The above mentioned features of the camera, when applicable, apply to this second aspect as well. In order to avoid undue repetition, reference is made to the above.

According to a third aspect, a non-transitory computer readable storage medium is provided. The non-transitory computer readable storage medium has computer readable program code stored thereon which when executed on a device having processing capability is configured to perform the method according to the second aspect.

A further scope of applicability of the present teachings will become apparent from the detailed description given below. However, it should be understood that the detailed description and specific examples, while indicating preferred embodiments, are given by way of illustration only, since various changes and modifications within the scope of the disclosure will become apparent to those skilled in the art from this detailed description.

Hence, it is to be understood that this disclosure is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

A more detailed understanding may be had from the following description, given by way of example in conjunction with the accompanying drawings where.

As illustrated in the figures, the sizes of layers and regions may be exaggerated for illustrative purposes and, thus, are provided to illustrate the general structures of embodiments. Like reference numerals refer to like elements throughout.

DETAILED DESCRIPTION

The present teachings will now be described more fully hereinafter with reference to the accompanying drawings, in which embodiments are shown. The teachings may, however, be embodied in many different forms and should not be construed as limited to the embodiments set forth herein; rather, these embodiments are provided for thoroughness and completeness, and to fully convey the scope of the teachings to the skilled person.

Figure 1:
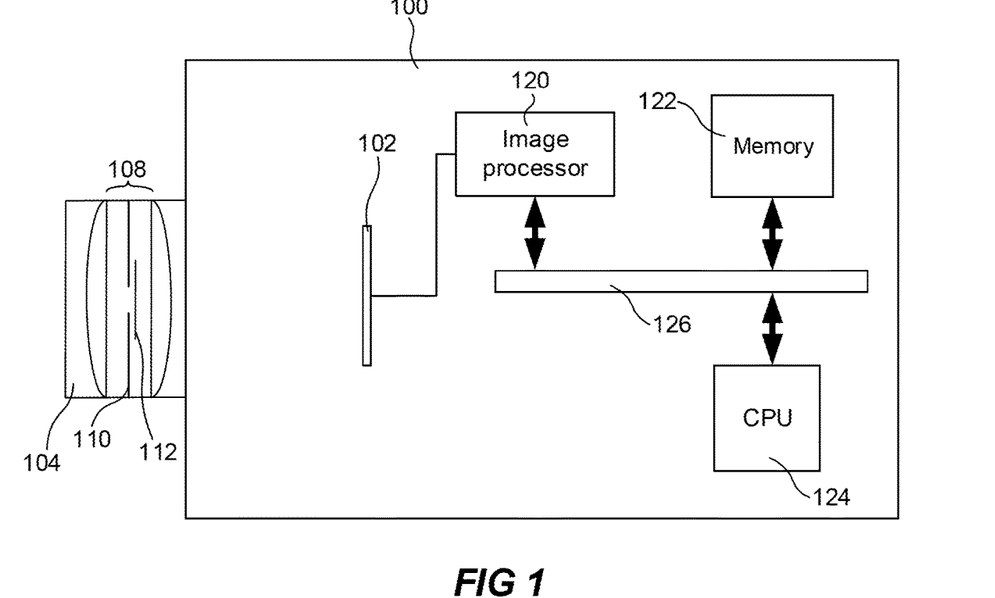
FIG. 1 illustrates a camera.

FIG. 1 illustrates a camera 100 having an image sensor 102 and a camera lens housing 104. The camera may be a video camera. The camera 100 may be a monitoring camera.

The camera lens housing 104 and the image sensor 102 are arranged such that radiation entering the camera 100 via the camera lens housing 104 is interacting with the image sensor 102. Hence, the camera is configured to capture images of a scene viewed by a lens system 108 of the camera lens housing 104. The radiation entering the camera 100 typically comprises both visible light and IR-radiation.

Figure 5:
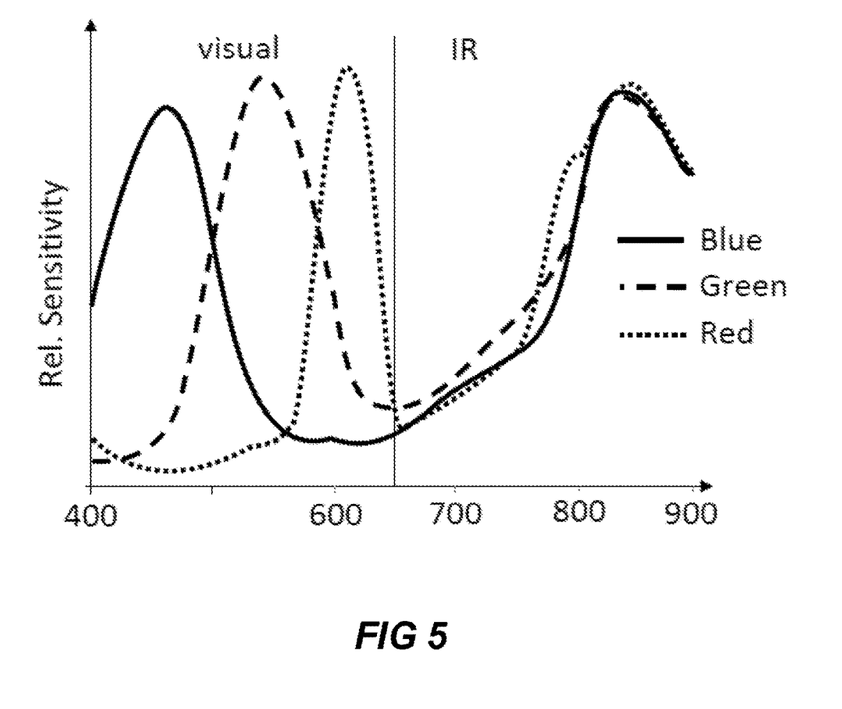
FIG. 5 illustrates response curves for red, green and blue pixels of an image sensor.

For capturing the images of the scene, the image sensor 102 comprises a plurality of pixels distributed over a plane of the image sensor 102. The pixels of the image sensor are typically sensitive to both visible light and IR-radiation, or more particularly near-infrared radiation (NIR). If the transmitted radiation were fully spectrally resolved it would be readily possible to monitor and evaluate the proportions of different colors of visible light and IR-radiation, but it should be noted that generally the image sensor 102 (and associated components, comprising e.g., an image processor 120) will at the most sort the incoming radiation into red, green and blue components, each of the color components including an IR component, which is indicated in FIG. 5, so as to be able to regenerate a color image. In FIG. 5 response curves for red, green and blue pixels of an image sensor are exemplified. It is generally not possible to isolate the IR-component at all. For some implementations an IR-cut filter is used for blocking the IR-component of radiation before the radiation is arriving at the image sensor. The reason is that introduction of IR-radiation to the image sensor will distort the color correction performed by a camera controller, since IR-radiation will affect all pixels, referring to FIG. 5, and an IR-cut filter is necessary to be able to provide a true color representation.

The camera lens housing 104 comprises a lens system 108 and an aperture 110.

The aperture 110 may also be referred to as a diaphragm. The role of the aperture 110 is to stop the passage of light, except for the light passing through the aperture 110. The aperture 110 may be a fixed aperture having a fixed sized opening. By having a fixed aperture having a fixed sized opening a camera with less moveable parts is provided. Alternatively, the aperture 110 may be an iris aperture wherein the size of the aperture opening may be varied. By controlling the size of the opening of the aperture 110 it is possible to control the amount of radiation reaching the image sensor 102, which of course is well known from regular iris apertures used in cameras.

The aperture 110 is placed in a so called aperture stop plane of the lens system 108, or rather as close to the aperture stop plane as physically possible. In the rest of this disclosure the aperture stop plane will simply be referred to as the aperture stop. In a normal configuration the plane of the aperture stop represents a position where there is no spatial correlation with the plane of the image sensor 102. For an ideal single-lens system the aperture stop would be positioned in the middle of the lens, orthogonally to the optical axis. The aperture stop limits how much light from each point of the object that reaches a conjugate image point (the image sensor in our case). The aperture stop thus defines a plane in the beam path, and sometimes the term "aperture plane" is used for the same feature. A feature of this plane is that it is a position in which alterations in a size of an aperture will affect the entire image plane equally, at least in an ideal situation. Further to what has already been discussed, the features of the aperture stop imply that the size of the aperture will only affect the amount of light reaching the image sensor 102, not the actual image. More specifically, it will not generate any shadowing or similar effects or artefacts in the image plane, (i.e., in the plane of the image sensor 102). For this reason, it is standard practice to position the aperture 110 (the diaphragm) in the aperture stop. Within the context of the disclosure "the aperture" corresponds to an iris aperture or a fixed sized aperture arranged in or in the vicinity to the aperture stop. The filter shall preferably be close enough to the aperture that all light passing the filter affects the image sensor equally.

Returning to the image sensor 102, at least some pixels of the image sensor 102 belongs to a plurality of pairs of pixels. Hence, the image sensor 102 comprises a plurality of pairs of pixels. In the literature the plurality of pairs of pixels is often named phase pixels, phase detection pixels, or dual pixels. Image sensors with a plurality of pairs of pixels, as used for the present teachings, are today already used for performing phase detection autofocusing. Some such known sensors have a relatively small number of phase pixels spread over the sensor are, whereas in others all pixels are phase pixels.

Figure 2A:
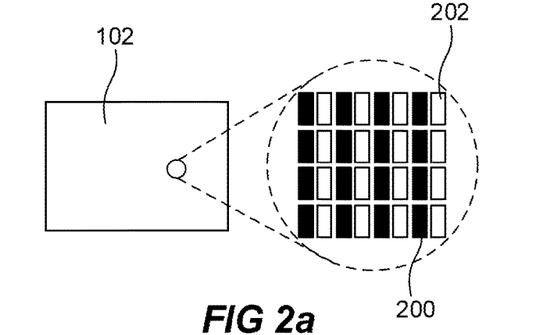
FIGS. 2a, 2b and 2c illustrate different embodiments of an image sensor comprising pairs of pixels.
Figure 2B:
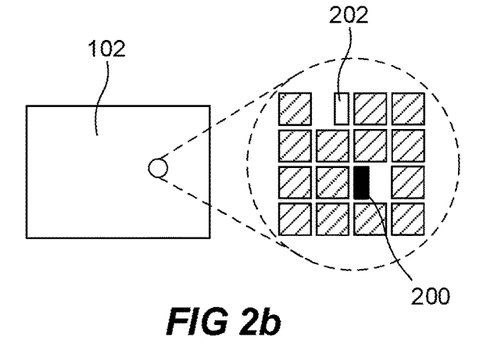
Figure 2C:
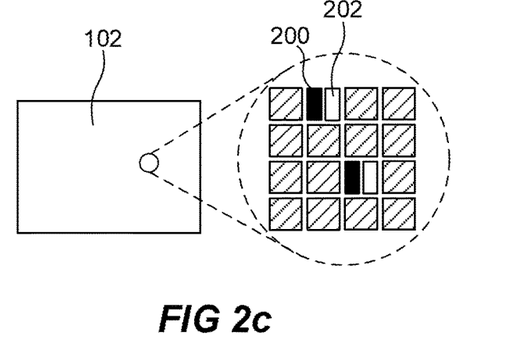

All the pixels of the image sensor 102 may be phase pixels. Hence, as illustrated in FIG. 2a, each pixel of the image sensor 102 may belong to a respective pair of pixels. Each pair of pixels comprises a first pixel 200 and a second pixel 202. Alternatively, the image sensor 102 may have a smaller number of phase pixels spread out over the sensor area. Hence, as illustrated in FIGS. 2b and 2c, a subset of the pixels of the image sensor 102 may belong to a respective pair of pixels.

In each pair of pixels, the first pixel 200 is configured such that it detects radiation which has entered the camera 100 through the aperture 110 and traveled from the aperture 110 to the image sensor 102 via a first radiation path, and the second pixel 202 is configured such that it detects radiation which has entered the camera 100 through the aperture 110 and traveled from the aperture 110 to the image sensor 102 via a second radiation path. The second radiation path is different from the first radiation path. The second radiation path may be separate from the first radiation path. Hence, the first and second radiation paths may be non-overlapping.

In each pair of pixels, a first half of the first pixel 200 may be masked such that the first pixel 200 detects radiation which has entered the camera 100 through the aperture 110 and traveled from the aperture 110 to the image sensor 102 via the first radiation path and a second half of the second pixel 202 may be masked such that the second pixel 202 detects radiation which has entered the camera 100 through the aperture 110 and traveled from the aperture 110 to the image sensor 102 via the second radiation path. The second half may be complementary to the first half.

In each pair of pixels, a first pixel 200 may be shaped such that the first pixel 200 detects radiation which has entered the camera 100 through the aperture 110 and traveled from the aperture 110 to the image sensor 102 via the first radiation path, and a second pixel 202 may be shaped such that the second pixel 202 detects radiation which has entered the camera 100 through the aperture 110 and traveled from the aperture 110 to the image sensor 102 via the second radiation path. The second pixel 202 may be complementary shaped with respect to the first pixel 200.

The camera lens housing 104 further comprises a filter 112. The filter 112 is arranged in, or in the vicinity of, the aperture 110. The filter 112 is preferably close enough to the aperture plane such that only the amount of light is affected, not the spatial image. There is an added benefit in having the filter 112 in, or in the vicinity of, the aperture 110, and thereby close to the plane of the aperture stop. This since in a normal configuration the plane of the aperture stop represents a position where there is no spatial correlation with the plane of the image sensor 102.

In case the filter 112 is arranged in the vicinity of the aperture 110, the filter 112 may be arranged in between the aperture 110 and the image sensor 102, or on the outside of the aperture.

Figure 3A:
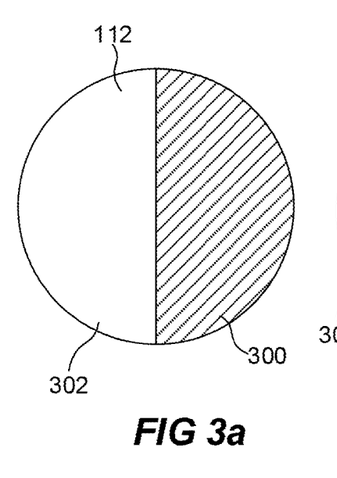
FIGS. 3a, 3b and 3c illustrate different embodiments of a filter.
Figure 3B:
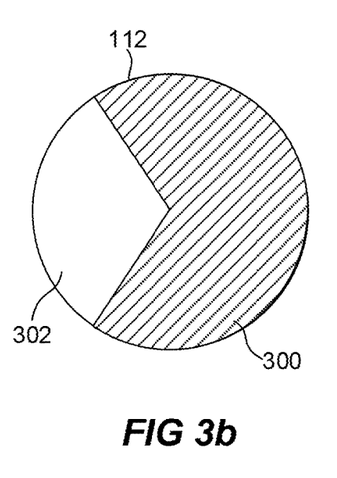
Figure 3C:
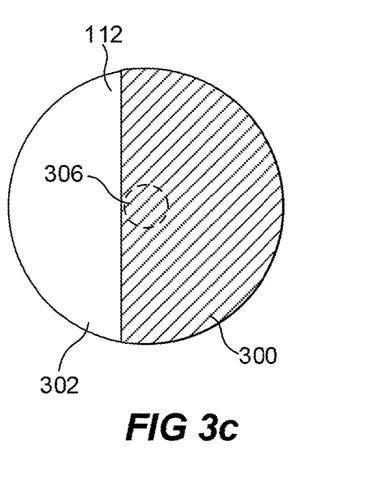

As illustrated in FIGS. 3a, 3b, and 3c, the filter 112 comprises a first portion 300 configured to block IR-radiation or visible light and a second portion 302 configured to be transparent to wavelengths that are blocked by the first portion.

Figure 4A:
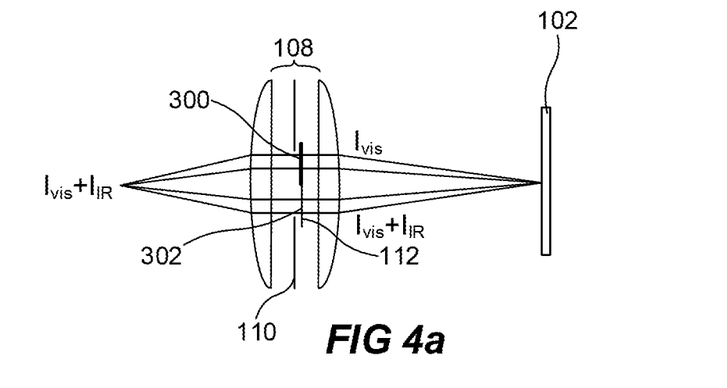
FIGS. 4a, 4b and 4c illustrate different configurations of filters and how they block IR-radiation and/or visible light.
Figure 4B:
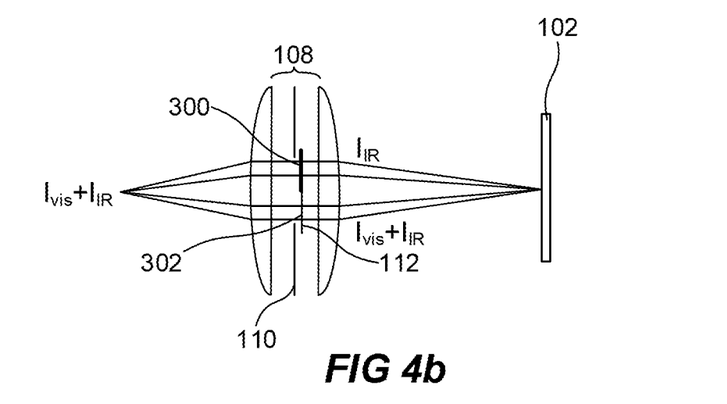

The filter 112 may be made out of a material transparent to visible light and to IR-radiation. Examples of such material are glass and plastics. The filter may comprise a solid sheet. The sheet may be partly covered by one or more coatings. The portion of the filter 112 with the one or more coatings may be the first portion 300 of the filter 112. Also the second portion 302 of the filter 112 may be covered by one or more coatings. However, the second portion 302 of the filter may also not be covered by any wavelength blocking coatings. A specific composition of one or more coatings may block radiation with wavelengths in a specific range of wavelengths and may allow radiation with wavelengths in another specific range of wavelengths to pass. This will be further discussed in connection with FIGS. 4a, 4a and 4c.

The portioning of the filter 112 may be made, just as illustrated in FIG. 3a, such that the first portion 300 represents a first half of the filter 112 and the second portion 302 represents a second half of the filter 112, the second half being complementary to the first half. However, the portioning may be made differently. This will now be discussed further in connection with FIGS. 3b and 3c.

FIGS. 3b and 3c illustrate two different exemplifying embodiments of a filter 112 having a first portion 300 being larger than the second portion 302. According to these exemplifying embodiments the first portion 300 is configured to block IR-radiation. The filter designs exemplified in FIGS. 3b and 3c are just two examples out of many possible designs where the first portion 300 is larger than the second portion 302. By making the IR-blocking portion of the filter 112 larger than the non-IR-blocking portion of the filter 112 the risk of leakage of IR-radiation to the pixels out of the pairs of pixels that are not supposed to detect IR-radiation is reduced. Still, this may come at the expense that the estimation of IR-radiation in the scene may not be as accurate, since the pixels in the second path will get a mixture of filtered and unfiltered radiation. According to the filter design illustrated in FIG. 3c, the filter 112 may have a dual function. In addition to partly blocking IR-radiation, as being useful for low light conditions as is discussed within the context of this disclosure, the filter 112 may also be used as an IR-cut filter during day light conditions. This since during day light conditions the aperture 110, in the form of an iris aperture, is typically reduced in size such that it is operated within an area 306 located within the first portion 300 of the filter 112. With such a design of the filter, the above-mentioned problem with mixing filtered and unfiltered radiation in the second path may be alleviated if the pixels in the pixel pairs are formed with different sizes, such that they receive different amounts of light.

The filter 112 may be movable such that it may be positioned in and retracted from the first and second radiation paths. Alternatively, the filter 112 may be fixedly positioned in, or in the vicinity of, the aperture 110.

The filter 112 and the image sensor 102 are arranged such that the portioning of the filter 112 is aligned with or parallel to the orientation of the first and second pixels 200, 202 of the plurality of pairs of pixels. The alignment will lead to that the first pixels 200 will receive radiation having passed the first portion 300 of the filter 112 and the second pixels 202 will receive radiation having passed the second portion 302 of the filter 112. The filter 112 and the image sensor 102 is thus arranged relative to each other such that radiation passing the first portion 300 of the filter 112 travels to the first pixels 200 of the plurality of pairs of pixels, and such that radiation passing the second portion 302 of the filter 112 travels to the second pixels 202 of the plurality of pairs of pixels. The aligning of the filter 112 and the image sensor 102 may be made such that the portioning of the filter 112 is arranged parallel to an orientation of the first and second pixels 200, 202 of the image sensor 102.

In the embodiments shown, the pixel pairs as well as the filter are divided into a left portion and a right portion. It should be noted that also other divisions are possible, such as an upper portion and a lower portion, or any other orientation.

The present set-up with the filter 112 having a first portion 300 configured to block IR-radiation or visible light and a second portion 302 configured to be transparent to wavelengths that are blocked by the first portion, and the image sensor 102 comprising a plurality of pairs of pixels as defined above enables estimation of an amount of IR-radiation comprised in the radiation entering the camera 100. This using an image sensor which does not in itself discriminate between visible light and IR-radiation. The estimation of the amount of IR-radiation may, for example, be used for producing color images even during low light conditions. This will be discussed in more detail further down in this description.

There are a number of possible configurations of the filter 112 that may be used in connection with the present teachings.

According to a first configuration, the first portion 300 is configured to block IR-radiation and the second portion 302 is configured to be transparent to IR-radiation. For this first configuration, both the first portion 300 and the second portion 302 of the filter 112 are configured to allow visible light to pass. Accordingly, the first portion 300 of the filter 112 is configured to block IR-radiation and allow visible light to pass and the second portion 302 of the filter 112 is configured to allow both visible light and IR-radiation to pass. This is illustrated in FIG. 4a. Radiation having intensity in both the visible spectral range, $I_{vis}$, and in the IR spectral range, $I_{IR}$, is entering the filter 112. The first portion 300 of the filter 112 will block IR radiation and allow visible light to pass, hence, the radiation passing the first portion 300 of the filter 112 will only have intensity in the visible spectral range, $I_{vis}$. The second portion 302 of the filter 112 will allow both IR radiation and visible light to pass, hence, the radiation passing the second portion 302 of the filter 112 will have intensity in both the IR spectral range, $I_{IR}$, and the visible spectral range, $I_{vis}$. The first pixels 200 of the plurality of pixels will then produce a signal, $S_1$, proportional to $I_{vis}$ and the second pixels 202 of the plurality of pixels will then produce a signal, $S_2$, proportional to $I_{vis}+I_{IR}$. From this the amount of IR radiation may be estimated as $S_2-S_1$. Further, the contribution from visible light in signals, $S_{tot}$, from pixels of the images sensor 102 detecting both IR-radiation and visible light may then be estimated to be, $S_{tot}-(S_2-S_1)$.

According to a second configuration, the first portion 300 is configured to block visible light and the second portion 302 is configured to be transparent to visible light. For this second configuration, both the first portion 300 and the second portion 302 of the filter 112 are configured to allow IR-radiation to pass. Accordingly, the first portion 300 of the filter 112 is configured to block visible light and allow IR-radiation to pass and the second portion 302 of the filter 112 is configured to allow both visible light and IR-radiation to pass. This is illustrated in FIG. 4b. Radiation having intensity in both the visible spectral range, $I_{vis}$, and in the IR spectral range, $I_{IR}$, is entering the filter 112. The first portion 300 of the filter 112 will block visible light and allow IR radiation to pass, hence, the radiation passing the first portion 300 of the filter 112 will only have intensity in the IR spectral range, $I_{IR}$. The second portion 302 of the filter 112 will allow both IR radiation and visible light to pass, hence, the radiation passing the second portion 302 of the filter 112 will have intensity in both the IR spectral range, $I_{IR}$, and the visible spectral range, $I_{vis}$. The first pixels 200 of the plurality of pixels will then produce a signal, $S_1$, proportional to $I_{IR}$ and the second pixels 202 of the plurality of pixels will then produce a signal, $S_2$, proportional to $I_{vis}+I_{IR}$. From this the amount of IR radiation may be estimated as $S_1$. Further, the contribution from visible light in signals, $S_{tot}$, from pixels of the images sensor 102 detecting both IR-radiation and visible light may then be estimated to be, $S_{tot}-S_1$.

Figure 4C:
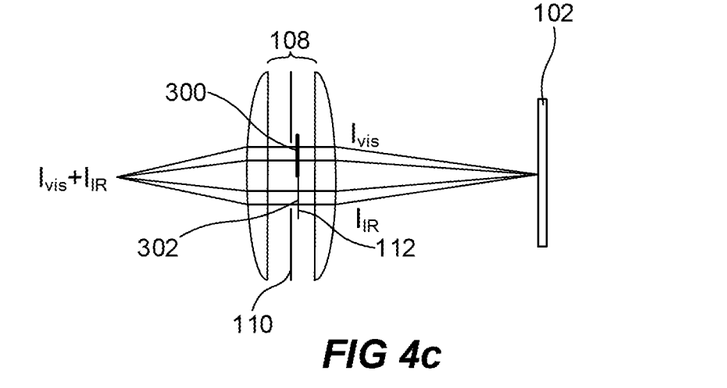

According to a third configuration, the first portion 300 is configured to block IR-radiation and the second portion 302 is configured to be transparent to IR-radiation. Further, the first portion 300 is configured to be transparent to visible light and the second portion 302 is configured to block visible light. Accordingly, the first portion 300 of the filter 112 is configured to block IR-radiation and allow visible light to pass and the second portion 302 of the filter 112 is configured to allow IR-radiation to pass and to block visible light. This is illustrated in FIG. 4c. Radiation having intensity in both the visible spectral range, $I_{vis}$, and in the IR spectral range, $I_{IR}$, is entering the filter 112. The first portion 300 of the filter 112 will block IR radiation and allow visible light to pass, hence, the radiation passing the first portion 300 of the filter 112 will only have intensity in the visible spectral range, $I_{vis}$. The second portion 302 of the filter 112 will allow IR radiation to pass but will block visible light, hence, the radiation passing the second portion 302 of the filter 112 will have intensity in the IR spectral range, $I_{IR}$. The first pixels 200 of the plurality of pixels will then produce a signal, $S_1$, proportional to $I_{vis}$ and the second pixels 202 of the plurality of pixels will then produce a signal, $S_2$, proportional to $I_{IR}$. From this the amount of IR radiation may be estimated as $S_2$. Further, the contribution from visible light in signals, $S_{tot}$, from pixels of the images sensor 102 detecting both IR-radiation and visible light may then be estimated to be, $S_{tot}-S_2$.

Hence, regardless of the configuration of the filter 112 a proportion of IR-radiation in the scene may be calculated.

The camera 100 may comprise a processor 124. The processor 124 may be a single core processor or a multicore processor. The processor 124 may be any suitable processor for performing digital data processing. The processor 124 may be configured to process signals from the first pixels 200 of the plurality of pairs of pixels and signals from the second pixels 202 of the plurality of pairs of pixels. Alternatively, the image processor 120 may be configured to process signals from the first pixels 200 of the plurality of pairs of pixels and signals from the second pixels 202 of the plurality of pairs of pixels. Yet alternatively, the signals from the first and second pixels 200, 202 may be partly processed by the processor 124 and partly by the image processor 120.

The camera 100 may further comprise a memory 122. The memory 122 may be any kind of volatile or non-volatile memory. Further, the memory 122 may comprise a plurality of memory units. The memory 122 may be used as a buffer memory for buffering data while performing processing by the processor 124 and/or the image processor 120. The memory may, for example, be configured to buffer information pertaining to pixel value signals for the pixels of the image sensor 102.

The image processor 120, the memory 122 and the processor 124 may communicate over a data bus 126.

A processing unit, either the processor 124, the image processor 120 or a combination thereof, of the camera 100 may be configured to determine, for each of the first pixels 200 of the plurality of pairs of pixels, a value indicative of a first amount of radiation detected by the respective first pixel 200. The processing unit of the camera 100 may further be configured to determine, for each of the second pixels 202 of the plurality of pairs of pixels, a value indicative of a second amount of radiation detected by the respective second pixel 202. Based on the values indicative of first and second amount of radiation determined for each of the first and second pixels 200, 202 of the plurality of pairs of pixels the processing unit may be configured to calculate a proportion of IR-radiation in the scene. The proportion of IR-radiation may be different for different areas of the scene. Since the image sensor 102 comprises a plurality of pairs of pixels a proportion of IR-radiation in different areas of the scene may be determined. This especially if the pairs of pixels are evenly distributed over an area of the image sensor 102.

By determining the proportion of IR-radiation, it will be possible to evaluate the contribution of visual light. The evaluation may be performed on any level of resolution for the image, ranging from individual pixels or groups of pixels to larger portions of the image frame, or the entire image frame. Also, the evaluation may be based on single frames, but for better statistics a number of image frames may be combined to form a mean value before the evaluation is performed.

Following the evaluation, it will be possible to isolate the contributions from visual and infrared wavelengths, and to compensate a resulting image accordingly. Hence, based on the calculated proportion of IR-radiation in the scene the processing unit may be configured to produce a color image of the scene by compensating for an IR-contribution in an image captured by the camera 100.

In summary, in order to produce color images even under low light conditions it is realized that the following will give good results.

There are good results when as much radiation, (i.e., both visible light and IR-radiation), as possible reach the image sensor 102. This is done in order to reduce the gain needed on the image sensor and hence reduces the level of noise in the signal from the image sensor.

There are good results when the proportion of IR-radiation in the radiation reaching pixels of the image sensor 102 detecting both visible light and IR-radiation is determined. This may be done by filtering the radiation reaching the first and second pixels 200, 202 of the pairs of pixels differently.

There are good results when a color image is produced by compensating for an IR-contribution in an image captured by the camera.

Figure 6:
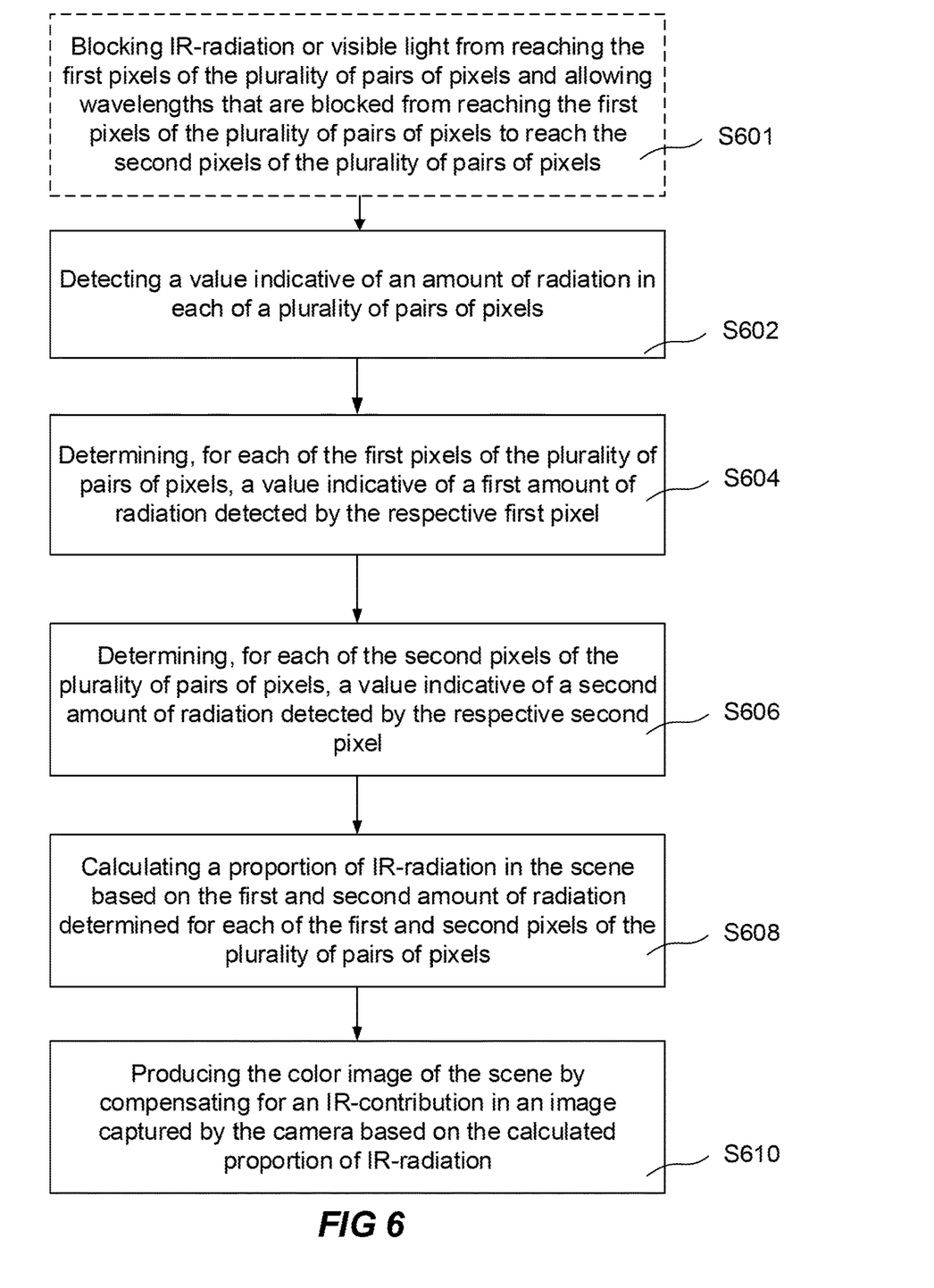
FIG. 6 is a flow diagram of a method of producing a color image.

In connection with FIG. 6, a method of producing a color image of a scene captured by a camera exposed to radiation comprising both visible light and IR-radiation will be discussed. The method comprises the following. Detecting S602 a value indicative of an amount of radiation in each of a plurality of pairs of pixels, wherein each pair comprises a first pixel and a second pixel. Hence, the camera comprises an image sensor comprising a plurality of pairs of pixels as discussed above. Determining S604, for each of the first pixels of the plurality of pairs of pixels, a value indicative of a first amount of radiation detected by the respective first pixel. Determining S606, for each of the second pixels of the plurality of pairs of pixels, a value indicative of a second amount of radiation detected by the respective second pixel. Calculating S608 a proportion of IR-radiation in the scene based on the first and second amount of radiation determined for each of the first and second pixels of the plurality of pairs of pixels. Producing S610 the color image of the scene by compensating for an IR-contribution in an image captured by the camera based on the calculated proportion of IR-radiation.

The method may further comprise blocking IR-radiation or visible light from reaching the first pixels of the plurality of pairs of pixels and allowing wavelengths that are blocked from reaching the first pixels of the plurality of pairs of pixels to reach the second pixels of the plurality of pairs of pixels.

The person skilled in the art realizes that the present teachings are by no means is limited to the embodiments described above. On the contrary, many modifications and variations are possible within the scope of the appended claims.

For example, further to its normal operation, the aperture 110 may have some extra features in terms of control and design. A design feature may involve the incorporation of the filter 112.

Further, the filter 112 may be configured to filter IR-radiation differently in the first and second radiation paths. For example, the first portion 300 of the filter 112 may be configured to block all IR-radiation and the second portion 302 of the filter 112 may be configured to block all IR-radiation except a predetermined sub-portion of wavelengths in the IR-spectrum. This may, for example, be useful in implementations when an IR illuminator is used for illuminating the scene viewed by the camera 100, the IR illuminator being configured to illuminate the scene with wavelengths within the predetermined sub-portion of wavelengths in the IR-spectrum. Then the second portion of the filter is configured to allow IR-radiation in the predetermined sub-portion of wavelengths in the IR-spectrum to reach the image sensor. Then the IR-radiation in the predetermined sub-portion of wavelengths in the IR-spectrum may be compensated for. The IR illuminator may be arranged in or on the camera, or elsewhere in the scene.

Also, other types of filter may be used to filter radiation reaching the first and second pixels of the pairs of pixels differently. For example, different portions of the visible spectrum may be filtered differently. Just to mention one possible implementation, the green light may be filtered differently in order to study plants. Knowing spectral information about one or more disturbing light sources in an environment, the contribution of such light sources may be compensated for by using a filter having a first portion blocking the wavelengths of the one or more disturbing light sources and a second portion allowing the same wavelengths to pass, together with the image sensor comprising the plurality of pairs of pixels. With sensors sensitive to other parts of the radiation spectrum, the same principle may be used, for example, for studying ultraviolet radiation content in incoming radiation, by selectively blocking or transmitting UV radiation.

Moreover, one or more of the detecting of a value indicative of an amount of radiation in each of a plurality of pairs of pixels, the determining, for each of the first pixels of the plurality of pairs of pixels, a value indicative of a first amount of radiation detected by the respective first pixel, the determining for each of the second pixels of the plurality of pairs of pixels a value indicative of a second amount of radiation detected by the respective second pixel, the calculating a proportion of IR-radiation in the scene based on the first and second amount of radiation determined for each of the first and second pixels of the plurality of pairs of pixels, and the producing the color image of the scene by compensating for an IR-contribution in an image captured by the camera based on the calculated proportion of IR-radiation may be made in a device separate from the camera 100. Hence, the camera 100 may be configured to communicate with a device separate from the camera. Such a device may, for example, be a server. The server may, for example, be configured to service a plurality of cameras with the production of color images. The server may be configured to control one or more cameras as the camera 100 discussed above to set the one or more cameras in a day mode or in a night mode. In the day mode the filter 112 preferably is not used but instead an IR-cut filter blocking all IR-radiation from reaching the image sensor is used. Hence, the filter 112 may be retracted from the beam path of the respective camera 100 and the IR-cut filter may be inserted into the beam path of the respective camera 100. In the night mode the filter 112 is inserted into the beam path of the respective camera 100 and the IR-cut filter is retracted from the beam path of the respective camera 100.

As discussed above, the first portion 300 of the filter 112 may be configured to block all IR-radiation and the second portion 302 of the filter 112 may be configured to block all IR-radiation except a predetermined sub-portion of wavelengths in the IR-spectrum corresponding to wavelengths emitted by an IR illuminator arranged in the camera or elsewhere in the scene. In a variant of this configuration, the first portion of the filter may be transparent to visible light and the IR illuminator sub-portion of IR radiation, whereas the second portion of the filter blocks all IR radiation and only allows visible light through. In a mixed light scene, (i.e., a scene with IR radiation and a low level of visible light), such a configuration may be useful if the IR illuminator provides all or almost all the IR radiation in the scene, and there is little or no IR radiation outside the illuminator sub-spectrum. The IR-radiation added by the illuminator increases the total amount of radiation in the scene, and hence reduces the need for gain on the image sensor. The pixel pairs and the split filter makes it possible to determine the IR component and compensate for it, such that color images with good color fidelity may be produced also in low light, such as at dusk and dawn. Still, in daylight the sun may contribute significant amounts of IR radiation outside the spectral range of the IR illuminator, and therefore it would not be possible to determine the total amount of IR radiation in the incoming radiation. Therefore, the filter arrangement may be provided with an additional, movable filter, which blocks all IR radiation, or at least the spectral range of the IR illuminator, but is transparent to visible light. A filter arrangement using a combination of a fixed filter and a movable filter is described in applicant's European patent application No. 16207126.0. The additional filter may be inserted when there is a high light level in the scene. In such a lighting condition, the IR component is not necessary for keeping noise sufficiently low. In mixed light, when the visible light level is too low to give an acceptable signal-to-noise ratio, the movable IR cut filter may be removed, and the IR illuminator switched on, thereby allowing IR radiation from the illuminator to reach one pixel of each pixel pair. In darkness, such as at night, the movable IR cut filter should remain removed, and black and white images may be produced based on IR radiation from the illuminator and other sources, whereas the visible light contribution is insignificant.

In the embodiments shown in FIGS. 2a-c, the first and second pixels are each part of a pair of pixels. It should, however, be noted that the first and second pixels may be part of larger groups of pixels, such as triplets or quadruplets of pixels. In a triplet of pixels, there may, for instance be one first pixel and two second pixels, or vice versa. In a quadruplet of pixels, there may be two first pixels and two second pixels, but there may as well be one first pixel and three second pixels, or vice versa.

Additionally, variations to the disclosed embodiments can be understood and effected by the skilled person in practicing the present teachings, from a study of the drawings, the disclosure, and the appended claims.

What is claimed is:

1. A camera comprising:
    an aperture arranged between a front lens element of a lens system and a rear lens element of the lens system;
    an image sensor comprising a plurality of pairs of pixels in which pair:
        a first pixel is configured such that it detects radiation which has entered the camera through the aperture and travelled from the aperture to the image sensor via a first radiation path, and
        a second pixel is configured such that it detects radiation which has entered the camera through the aperture and travelled from the aperture to the image sensor via a second radiation path, the second radiation path being different from the first radiation path;
    a filter arranged in between the front lens element of the lens system, and the rear lens element of the lens system, wherein the filter comprises a first portion configured to block infrared (IR)-radiation or visible light and a second portion configured to be transparent to both IR-radiation and visible light, wherein the filter is arranged such that radiation passing the first portion travels to the first pixels of the plurality of pairs of pixels, and such that radiation passing the second portion travels to the second pixels of the plurality of pairs of pixels; and
    a processing unit configured to:
    determine, for each of the first pixels of the plurality of pairs of pixels, a value indicative of a first amount of radiation detected by the respective first pixel;
    determine, for each of the second pixels of the plurality of pairs of pixels, a value indicative of a second amount of radiation detected by the respective second pixel;
    calculate a proportion of IR-radiation in the scene based on the first and second amount of radiation determined for each of the first and second pixels of the plurality of pairs of pixels; and
    produce a color image of the scene by compensating for an IR-contribution in an image captured by the camera based on the calculated proportion of IR-radiation.

2. The camera according to claim 1, wherein the filter is fixedly positioned in, or in the vicinity of, the aperture.

3. The camera according to claim 1, wherein the filter is movable such that it may be positioned in and retracted from the first and second radiation paths.

4. The camera according to claim 1, wherein the portioning of the filter is aligned with the first and second pixels such that:
    IR-radiation will not reach the first pixels in the pair of pixels, and
    both IR-radiation and visible light will reach the second pixels in the pair of pixels.

5. The camera according to claim 1, wherein each pixel of the image sensor belongs to a respective pair of pixels.

6. The camera according to claim 1, wherein the image sensor is configured to, upon the camera being exposed to radiation comprising both visible light and IR-radiation, register a value indicative of an amount of radiation reaching each of the plurality of pairs of pixels.

7. A method of producing a color image of a scene captured by a camera exposed to radiation comprising both visible light and infrared (IR)-radiation, the method comprising:
    detecting a value indicative of an amount of radiation in each of a plurality of pairs of pixels, wherein each pair comprises a first pixel and a second pixel, wherein the first pixel is configured such that the first pixel detects radiation which has entered the camera through the aperture and travelled from the aperture to the image sensor via a first radiation path, wherein the second pixel is configured such that the second pixel detects radiation which has entered the camera through the aperture and travelled from the aperture to the image sensor via a second radiation path, the second radiation path being different from the first radiation path, wherein a filter arranged in between a front lens element of the lens system, and the rear lens element of the lens system, comprises a first portion configured to block infrared (IR)-radiation or visible light and a second portion configured to be transparent to both IR-radiation and visible light, wherein the filter is arranged such that radiation passing the first portion travels to the first pixels of the plurality of pairs of pixels, and such that radiation passing the second portion travels to the second pixels of the plurality of pairs of pixels;
    determining, for each of the first pixels of the plurality of pairs of pixels, a value indicative of a first amount of radiation detected by the respective first pixel;
    determining for each of the second pixels of the plurality of pairs of pixels a value indicative of a second amount of radiation detected by the respective second pixel;
    calculating a proportion of IR-radiation in the scene based on the first and second amount of radiation determined for each of the first and second pixels of the plurality of pairs of pixels; and
    producing the color image of the scene by compensating for an IR-contribution in an image captured by the camera based on the calculated proportion of IR-radiation.

8. The method according to claim 7, further comprising:
    blocking IR-radiation from reaching the first pixels of the plurality of pairs of pixels; and
    allowing both IR-radiation and visible light to reach the second pixels of the plurality of pairs of pixels.

9. The method according to claim 7, further comprising:
    blocking visible light from reaching the first pixels or the plurality of pairs of pixels; and
    allowing both IR-radiation and visible light to reach the second pixels of the plurality of pairs of pixels.

10. A non-transitory computer readable storage medium having instructions stored thereon for producing a color image of a scene captured by a camera exposed to radiation comprising both visible light and IR-radiation, execution of which by a computing device causes the computing device to perform operations comprising:
    detecting a value indicative of an amount of radiation in each of a plurality of pairs of pixels, wherein each pair comprises a first pixel and a second pixel, wherein the first pixel is configured such that the first pixel detects radiation which has entered the camera through the aperture and travelled from the aperture to the image sensor via a first radiation path, wherein the second pixel is configured such that the second pixel detects radiation which has entered the camera through the aperture and travelled from the aperture to the image sensor via a second radiation path, the second radiation path being different from the first radiation path, wherein a filter arranged in between a front lens element of the lens system, and the rear lens element of the lens system, comprises a first portion configured to block infrared (IR)-radiation and a second portion configured to be transparent to both IR-radiation and visible light, wherein the filter is arranged such that radiation passing the first portion travels to the first pixels of the plurality of pairs of pixels, and such that radiation passing the second portion travels to the second pixels of the plurality of pairs of pixels;

determining, for each of the first pixels of the plurality of pairs of pixels, a value indicative of a first amount of radiation detected by the respective first pixel;

determining for each of the second pixels of the plurality of pairs of pixels a value indicative of a second amount of radiation detected by the respective second pixel;

calculating a proportion of IR-radiation in the scene based on the first and second amount of radiation determined for each of the first and second pixels of the plurality of pairs of pixels; and producing the color image of the scene by compensating for an IR-contribution in an image captured by the camera based on the calculated proportion of IR-radiation.

11. A camera comprising:

an aperture arranged between a front lens element of a lens system and a rear lens element of the lens system;

an image sensor comprising a plurality of pairs of pixels in which pair:
- a first pixel is configured such that it detects radiation which has entered the camera through the aperture and travelled from the aperture to the image sensor via a first radiation path, and
- a second pixel is configured such that it detects radiation which has entered the camera through the aperture and travelled from the aperture to the image sensor via a second radiation path, the second radiation path being different from the first radiation path;

a filter arranged in between the front lens element of the lens system, and the rear lens element of the lens system, wherein the filter comprises a first portion configured to block infrared (IR)-radiation or visible light and a second portion configured to be transparent to both IR-radiation and visible light, wherein the filter is arranged such that radiation passing the first portion travels to the first pixels of the plurality of pairs of pixels, and such that radiation passing the second portion travels to the second pixels of the plurality of pairs of pixels, wherein the portioning of the filter is aligned with the first and second pixels such that:

visible light will not reach the first pixels in the pair of pixels; and both IR-radiation and visible light will reach the second pixels in the pair of pixels.

* * * * *